Patented July 31, 1928.

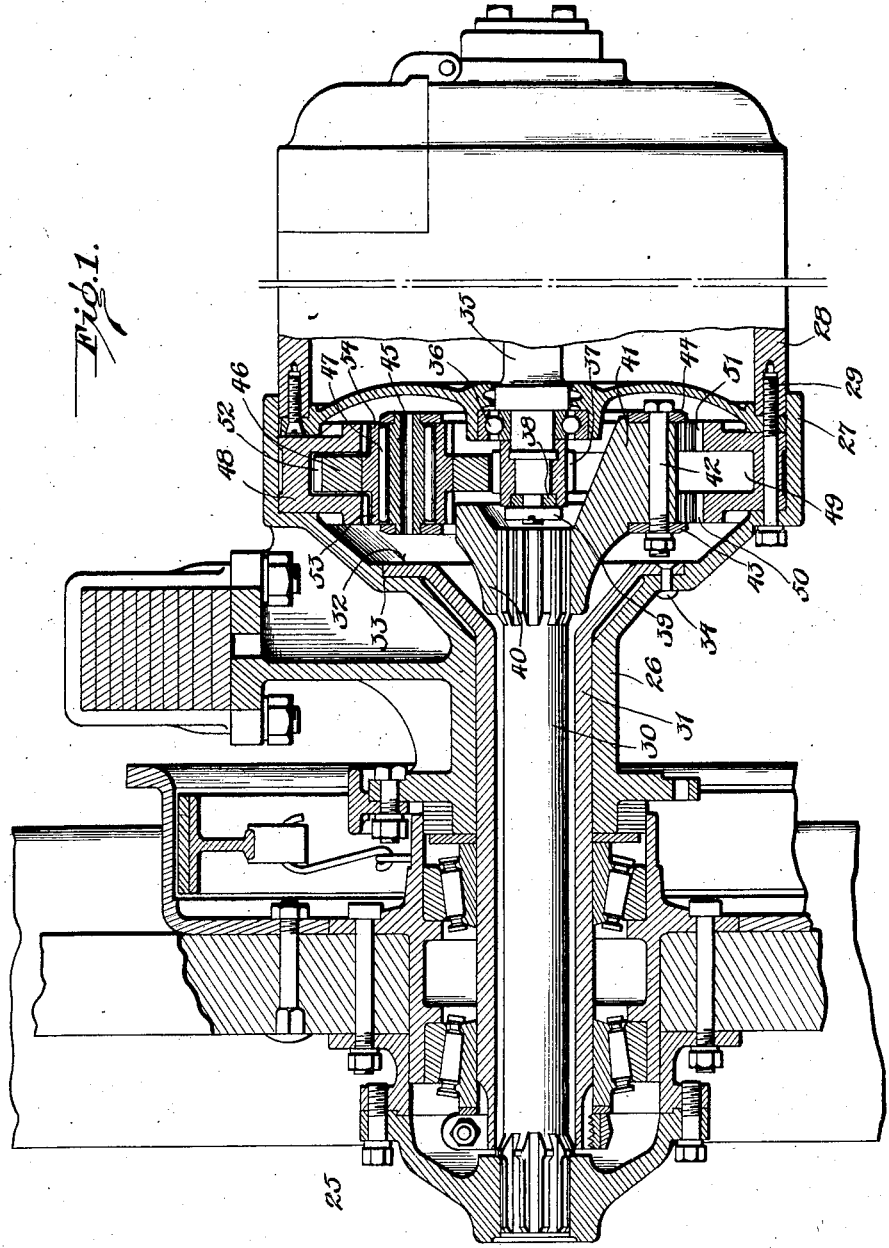

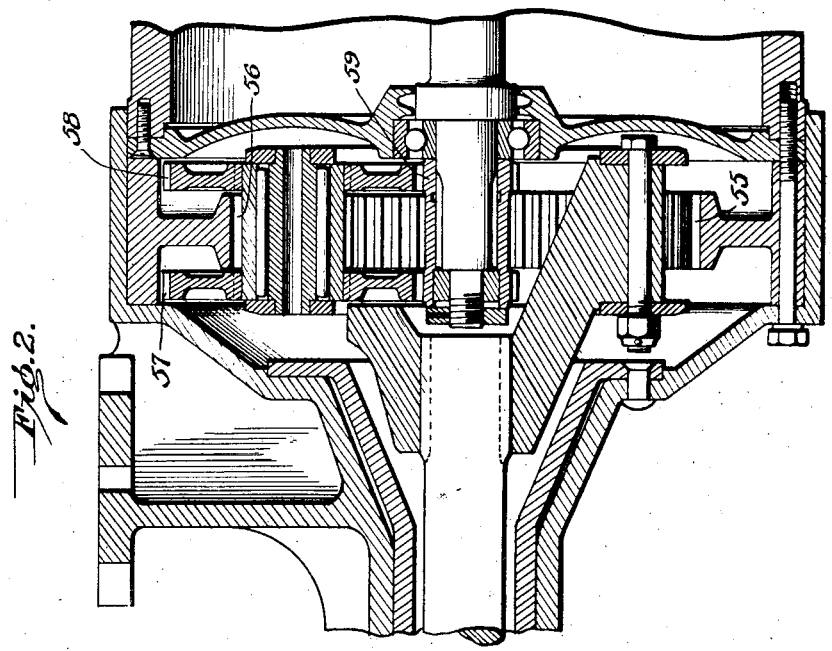
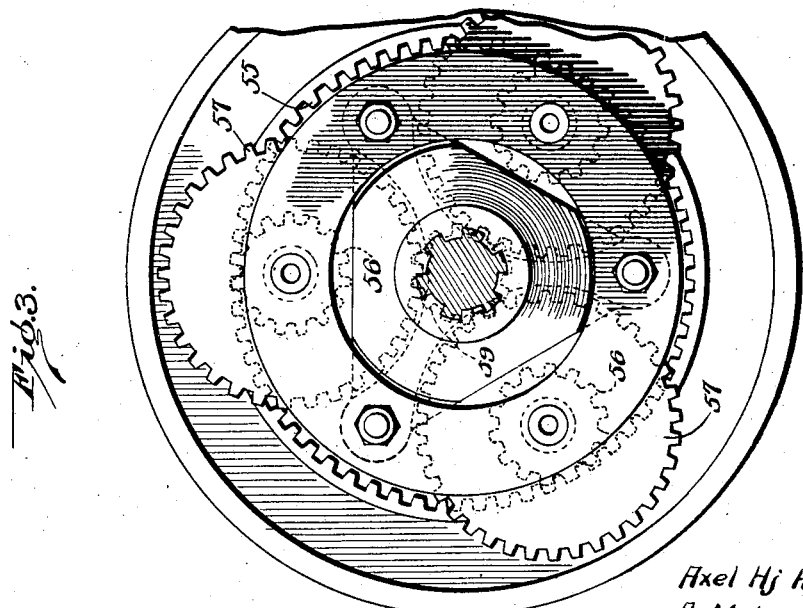

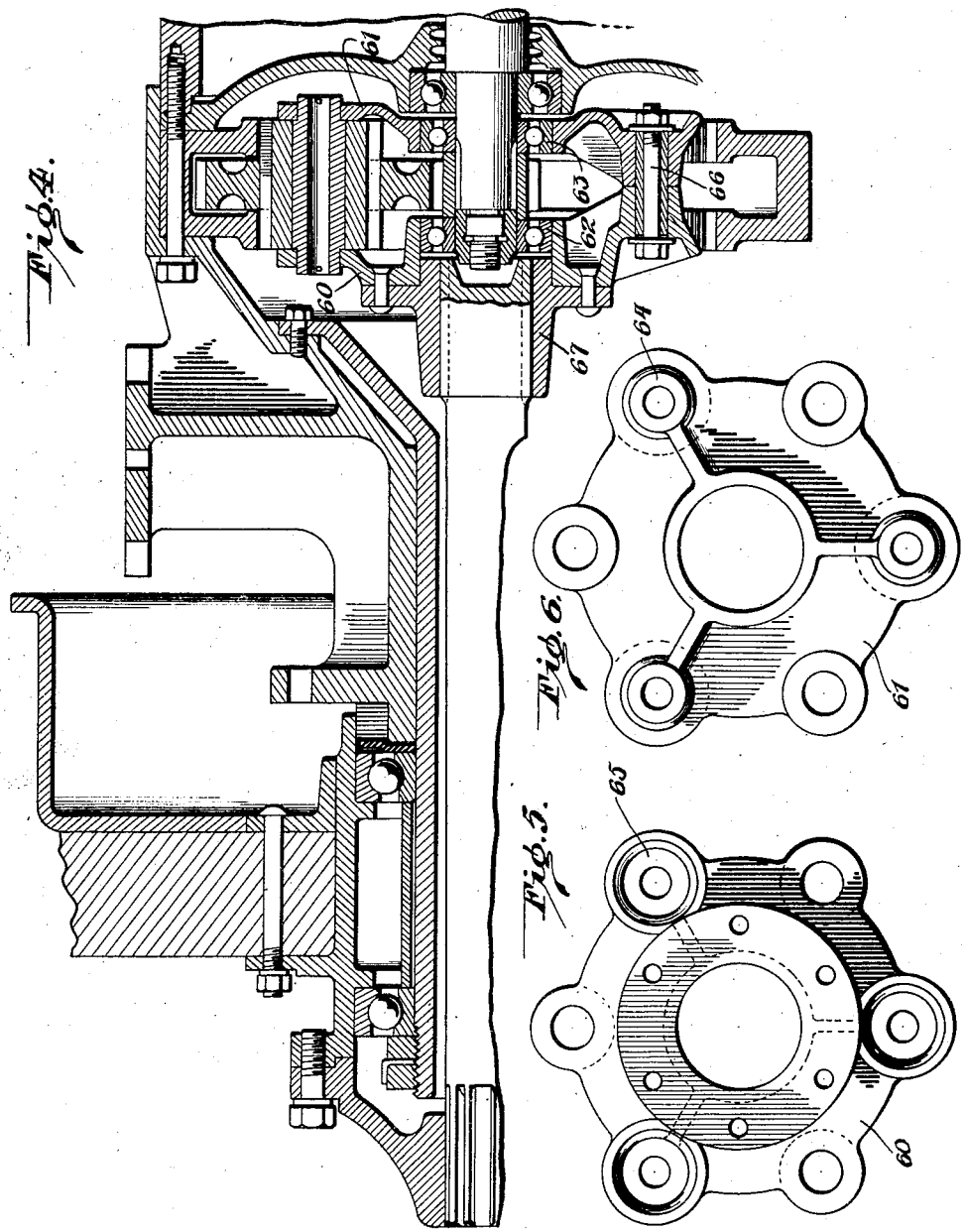

1,678,798

UNITED STATES PATENT OFFICE.

AXEL HJ. ASPROOTH, OF BALTIMORE, MARYLAND, AND ALFONSO M. LEONI, OF PHILADELPHIA, PENNSYLVANIA, ASSIGNORS TO ELECTRO-MOTIVE DEVICES, INC., OF PHILADELPHIA, PENNSYLVANIA, A CORPORATION OF NEW JERSEY.

ART OF AND MEANS FOR EFFECTING POWER TRANSMISSION.

Application filed February 27, 1923. Serial No. 621,581.

This invention relates to driving mechanism for vehicles of the type for use between a driving motor and a driven wheel and involving gear reduction provisions.

The planetary system of gearing, particularly that wherein the internal gear is stationary, has been more or less popular in gear reduction mechanism for electric driven vehicles on account of its centrality of drive and compactness combined with its range of speed reductions.

The conventional planetary gearing may be of the single or double reduction type. In the former, and as is obvious, all tooth pressures are balanced and hence the tendency towards twisting of the journals under driving stress is negligible. On the other hand, the tooth pressures are not balanced in the conventional planetary gearing of the double reduction type, with the result that bending and cocking reactions are developed and imposed upon the journals and the compound planet gears.

Manufacturers and designers are aware of this condition and have sought to successfully combat it by employing extra heavy journals in an effort to secure a rigid assembly. The practicability of this expedient is discounted by the high frictions that eventually ensue and by the fact that under repeated reversing the structure soon loses its rigidity.

The principal object of this invention is to provide driving mechanism primarily intended for electric driven vehicles wherein all objectionable reactive forces are eliminated or balanced.

The invention is illustrated in the accompanying drawings wherein—

Fig. 1 is a view principally in section showing the practical embodiment of the invention in a driving axle construction.

Fig. 2 is a similar view.

Fig. 3 is an end view of the balanced planetary system.

Fig. 4 is a sectional view of a modified embodiment; and

Figs. 5 and 6 are detail views of the spiders.

A practical embodiment of the invention is illustrated in Fig. 1, which shows the improved final drive applied to a standard wheel construction generally indicated at 25. The inner end of the wheel hub assembly is provided with an axle carrying casing or bracket 26, circumferentially enlarged at 27 to accommodate the motor casing 28 to which it is secured, as at 29. The part 27 of the axle casing constitutes a gear housing and the wheel driving shaft 30 is centered therein by a sleeve or hollow spindle 31 flared at its inner end and terminating in a flange or collar 32 seated in a recess 33 in the gear housing to which it is rigidly secured as by rivets 34. The motor or driving shaft 35, piloted by bearings such as 36, is provided with a fixed pinion 37. The pinion is centered with respect to the shaft by an accurately turned bushing 38 interposed between it and the shaft and retained by locking provision 39. Splined to the wheel driving shaft 30 is a spider 40 of rugged construction and whose arms 41 extend beyond the driving pinion 37 and serve to support by means of bolts 42 a pair of rings 43 and 44 in which are mounted journals 45 carrying the planet pinions 46, the journals providing roller paths 47 for said pinions. The pinions 46 co-operate with the driving pinion 37 and with an annular rack 48 fixedly secured to the gear housing. The element 48 is in reality a compound or double rack, that is to say it is divided by an annular recess 49 to form dual tracks 50 and 51. Similarly the planet gears are compound elements, the part 52 which engages the driving pinion 37 being accommodated in the recess 49 and the reduced ends or trunnion portions 53 and 54 engaging the tracks 50 and 51.

In the modification, Fig. 2, the fixed gear element or annular rack is of I beam section, the medial portion 55 constituting the track for the toothed portion 56 of the planet pinions, the toothed portions 57 and 58 of the latter in engagement with the compound driving pinion 59 being accommodated on either side of the track 55.

In the two constructions noted, elimination or balancing of objectional reactive forces is afforded by maintenance of uniform pitch line contact, or in other words by symmetry of drive.

Fig. 4 illustrates a construction wherein the spider is supported and centered by annular bearings, carried by the driving shaft. One way of accomplishing this is to provide a pair of spider sections or rings 60 and 61, whereof each is supported and centered by annular bearings, such as 62 and 63. As shown in Figs. 5 and 6, the spider rings may have telescopic provisions 64 and 65, which co-operate with bolts 66 for interlocking purposes. The ring 60 constitutes the driving section and is riveted or otherwise secured to a hub element 67 fixedly secured to the wheel driving shaft.

Having described our invention, we claim:—

1. A vehicle drive embodying a centered driving shaft, a centered driven shaft, a standard hub, a motor casing, an intermediate housing having a shoulder opposite the motor casing, a bell shaped stiffening core or spindle for the housing, an internal gear rigidly secured between said shoulder and the motor casing, a driving spider splined to the driven shaft, compound planets journaled in the spider in operative relation with the internal gear, a driving pinion, and a bushing for centering the pinion to maintain uniformity of pitch line contact.

2. A vehicle drive embodying a centered driving shaft, a centered driven shaft, a standard hub, a motor casing, an intermediate housing having a shoulder opposite the motor casing, a bell shaped stiffening core or spindle for the housing, an internal gear rigidly secured between said shoulder and the motor casing, a driving spider splined to the driven shaft, compound planets journaled in the spider in operative relation with the internal gear, a driving pinion, and an annular bearing mounted on the driving shaft for centering the spider.

In testimony whereof we affix our signatures.

AXEL HJ. ASPROOTH.
ALFONSO M. LEONI.